Nov. 28, 1939.　　　L. E. GORGER　　　2,181,270
IMPLEMENT HITCH
Filed Oct. 30, 1937　　　2 Sheets-Sheet 1
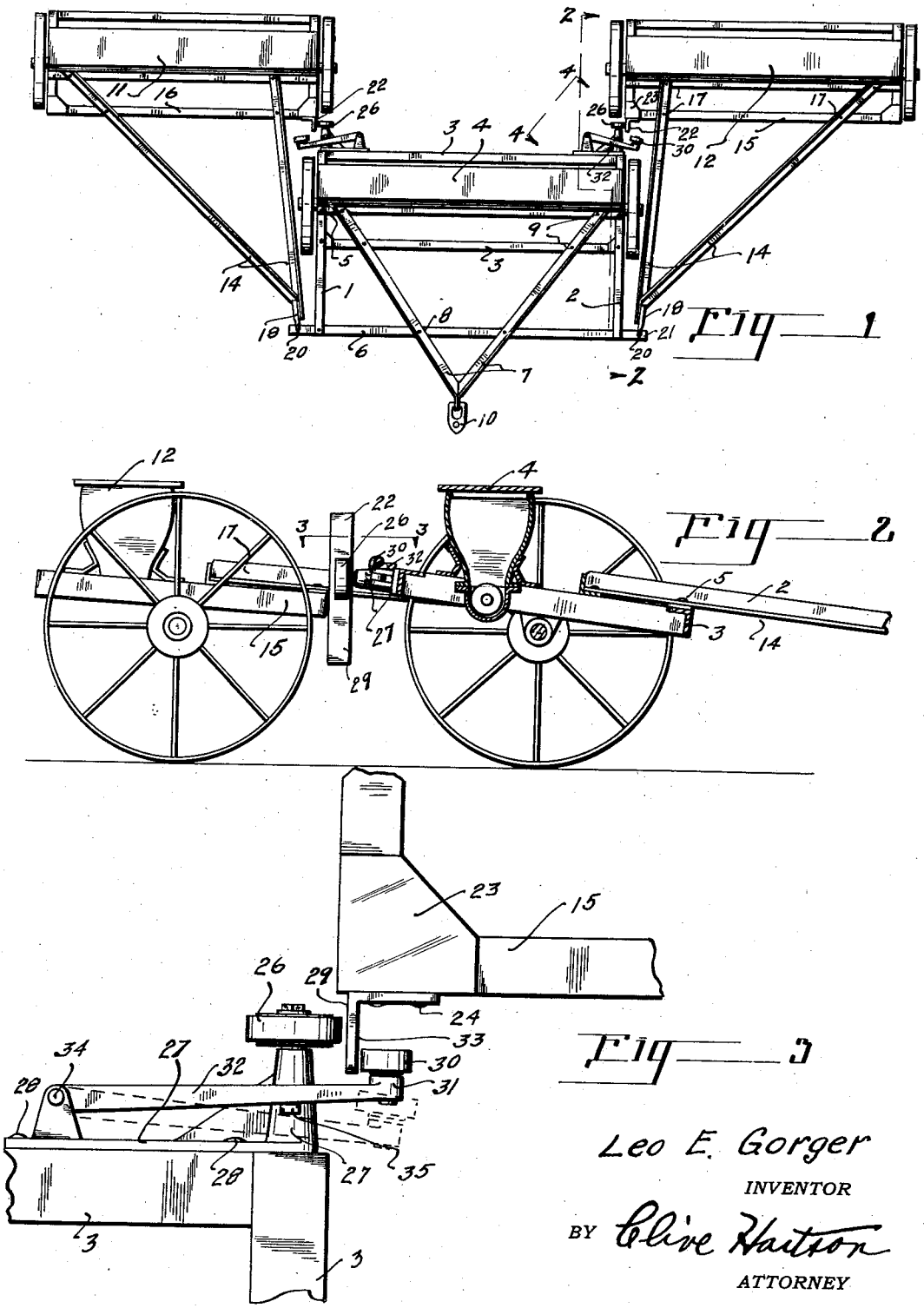
Leo E. Gorger
INVENTOR
BY Clive Hartson
ATTORNEY

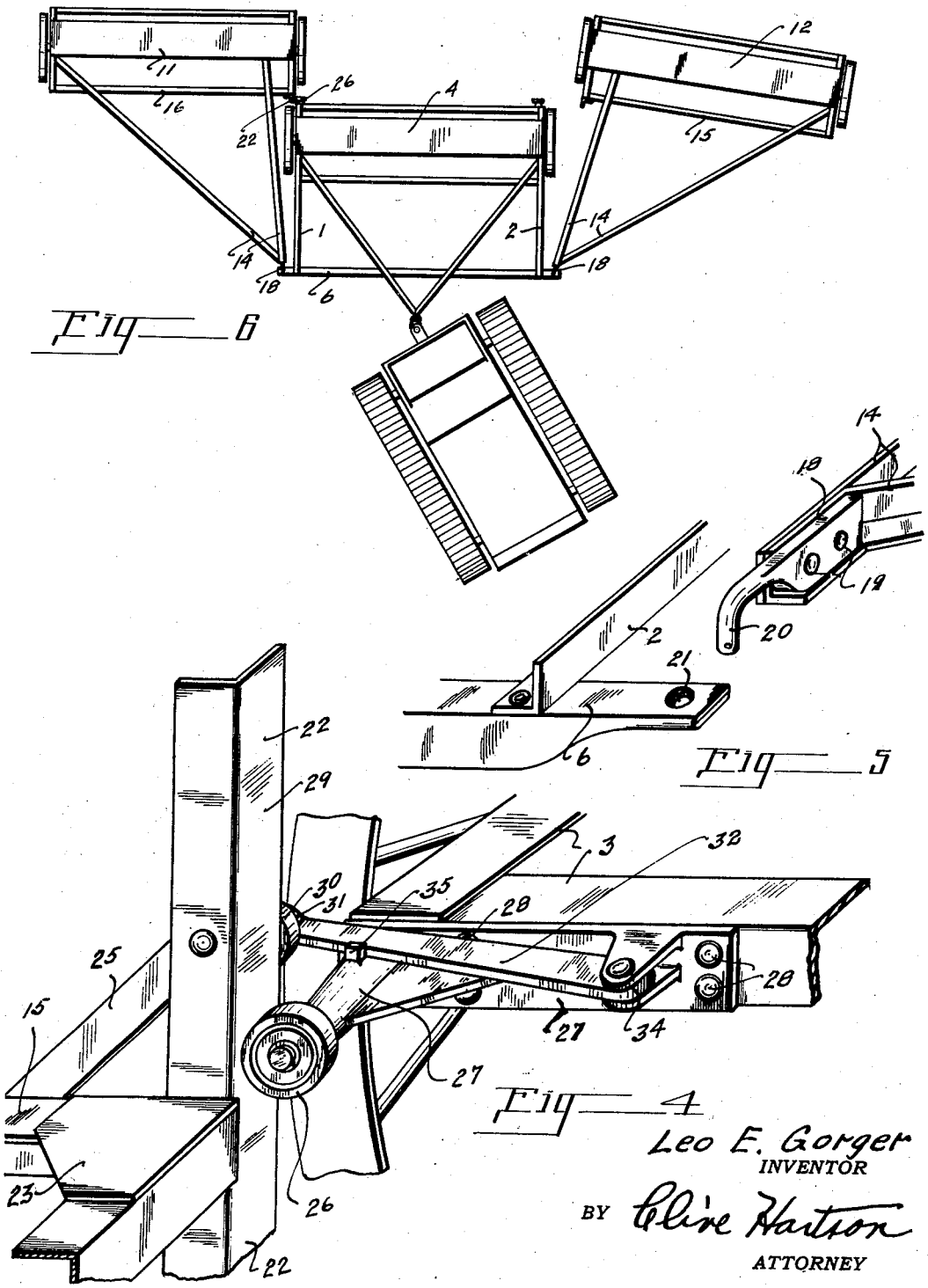

Patented Nov. 28, 1939

2,181,270

UNITED STATES PATENT OFFICE 2,181,270

IMPLEMENT HITCH

Leo E. Gorger, Lexington, Oreg.

Application October 30, 1937, Serial No. 171,863

4 Claims. (Cl. 97—233)

My invention relates to a hitch whereby two or more vehicles or implements may be drawn simultaneously.

An object of the invention is to provide an implement hitch whereby trailing implements follow a path immediately to the right or left or both of the leading implement.

An object of the invention is to provide means preventing trailing implements swaying or moving into the path traveled by the leading implement.

An object of the invention is to provide an implement hitch which will permit the implements connected by such hitch to make relatively sharp turns.

An object of the invention is to provide an implement hitch whereby two or more implements may be hitched to one another in close coupled formation.

An object of the invention is to provide a hitch whereby the trailing implements are provided with hitch elements whereby the implements are connected together in so far as the hitch element of one is connected to a hitch element of the other, thereby preventing the trailing implements being drawn upon the leading implement and wrecking the same in the event that the hitch connection of the leading implement, or between the leading implement and trailing implements should become disconnected.

An object of the invention is to provide a hitch which will permit the implements drawn thereby to be backed up.

These and other objects of the invention I attain by the mechanism illustrated in the accompanying drawings, wherein Figure 1 is a plan view illustrating my new and improved farm implement hitch applied to three standard drills.

Figure 2 is a sectional and end view, taken on line 2—2 of Figure 1, looking in the direction indicated. In both Figures 1 and 2 parts of the drill have been eliminated and are not here shown.

Figure 3 is a fragmentary plan view, taken on line 3—3 of Figure 2, and is for the purpose of illustrating my new and improved guiding assembly employed to hold the rear and outside drills in line with the forward or center drill.

Figure 4 is a perspective view, taken on line 4—4 of Figure 1 and is of the assembly illustrated in Figure 3.

Figure 5 is a fragmentary perspective view of the hitch employed by the two outside and rearward drills to the forward end of the center forward drill.

Figure 6 is a plan diagrammatical view of the tractor connected to the hitch of the three drills, illustrating a turn being made with the entire assembly.

In the drawings:

Figure 1 shows three drills assembled together with my new and improved implement hitch, parts of the drill being eliminated for convenience of illustration. Frames 1 and 2 are secured to the forward frame 3 of the drill 4 by suitable fastening means 5. The outer ends of the frames 1 and 2 are secured together by a cross frame 6. An A-frame 7 is secured to this cross frame at 8 and to the frame 3 of the drill at 9. This A-frame provides the hitch connection to the tractor draw bar and terminates in a swivel hitch portion 10 to be secured to the tractor draw bar. Drills 11 and 12 are connected to the cross bar 6 by means of the A-frames 14. These frames are mounted on the forward frames 16 and 15 of the drills 11 and 12, respectively, through fastening means 17.

Referring to Figure 5, a special fitting 18 is mounted on the forward end of each A-frame 14 by suitable fastening means 19. This fitting has a downwardly extending hook 20 for seating in the hole 21 in the outer end of the cross frame 6. In order to hold the drills 11 and 12 in line with the forward drill I have provided a vertical guide 22 mounted on the forward corners 23 of the frame 15 of the drills 11 and 12 by suitable fastening means 24. This vertical guide may be further supported by the brace 25. A guide wheel 26 is mounted on the rear corner of the frame 3 of the forward drill 4 by means of a bracket 27 mounted on the frame by suitable fastening means 28. This guide wheel engages the surface 29 of the vertical guide 22 mounted on the drills 11 and 12. I do not wish to be limited to mounting these guides in the manner shown or the wheel and bracket as shown as there may be different ways of mounting the same depending on the design of drills or implements used.

The object of the guide wheel contacting the vertical guide, is to hold the two outside drills at the sides of the forward drill. By referring to Figure 6 it will be noted in making a turn the outermost drill is held from crowding inwardly toward the middle drill while the innermost drill is permitted freedom in action, although if desired this drill could be held in alignment also. It will be noted that the hitches on the two outside drills are mounted on the inner sides of such side drills proximate the tractor hitch. This has a tendency for the outside drills to crowd inwardly against the center or forward drill. This is prevented by the action of the guide wheels 26 contacting the guides mounted on the side drills, as heretofore described. The coupling of all of the drill hitches as closely as possible to the tractor draw bar stabilizes the operation of all three drills and permits very close grouping to the tractor.

It becomes necessary at times to back the implements up, this may be accomplished by locking all implements together in the following manner, an additional guide wheel 30 or stop mounted on the end 31 of the arm 32 engages the inner side 33 of the vertical guide 22 and prevents the rear drill from leaving its direct alignment with the forward drill and making it possible to back all implements as one unit. This is an important object of my invention. The arm 32 is pivotally mounted on the bracket 27 at 34 and is held in either the position shown in Figure 3 or the dotted position, by simply raising slightly and positioning on either side of the stop 35. Again I do not wish to be limited to this particular form shown, as other means may be used to accomplish the object of my invention.

I claim:

1. In an implement hitch for hitching a plurality of implements together, a frame for a leading implement extending laterally to the lateral extremities of such implement, each trailing implement having a frame with an extremity, each of the last-mentioned extremities having means for connection to the frame of the leading implement, and means for preventing the movement of a trailing implement into the path traveled by the leading implement comprising a vertical guide mounted on one of such implements, and a roller mounted on the other engaging the guide when the trailing implement attempts to move into the path of the leading implement.

2. In an implement hitch for hitching a plurality of implements together, a frame for a leading implement extending laterally to the lateral extremities of such implement, a frame for each trailing implement having means in line with a lateral extremity of its trailing implement for connecting to a lateral extremity of the frame of the leading implement, said trailing implement being positioned to one side of and rearwardly of the leading implement, and a guide mounted on one implement and a roller on the other, with reference to the leading implement and a trailing implement, preventing the trailing implement moving into a position to the immediate rear of the leading implement.

3. In an implement hitch wherein a trailing implement is connected to a leading implement to travel a path at one side of the leading implement, means preventing the trailing implement from moving laterally into the path traveled by the leading implement comprising a vertical guide mounted on a lateral extremity of one implement nearest the other implement, and a roller journaled on the other implement at a lateral extremity nearest the first implement and arranged to engage the aforesaid guide.

4. In an implement hitch wherein a trailing implement is connected to a leading implement and having means for preventing the trailing implement moving into the path of the leading implement consisting of a vertical guide mounted on one implement and a roller to engage such guide journaled on the other implement, of means for securing a close connection between the implements in the region of roller and guide comprising a lever pivotally mounted on the implement on which the roller is journaled and having a free end, a roller mounted on said free end and movable, upon pivoting such lever, into engagement with the side of the guide opposite that engaged by the first mentioned roller.

LEO E. GORGER.